United States Patent [19]

Krumwiede et al.

[11] 4,372,770
[45] Feb. 8, 1983

[54] MELTING GLASS WITH TWO STAGE $NO_x$ CONTROL

[75] Inventors: John F. Krumwiede, Blawnox, Pa.; Alan G. Amrhein, Fresno, Calif.

[73] Assignee: PPG Industries, Inc., Pittsburgh, Pa.

[21] Appl. No.: 288,843

[22] Filed: Jul. 31, 1981

[51] Int. Cl.³ .............................................. C03B 5/16
[52] U.S. Cl. ......................................... 65/27; 65/32; 65/134; 110/210; 110/345; 423/235; 423/345
[58] Field of Search ............................ 65/134, 32, 27; 110/210, 345; 423/235, 239

[56] References Cited

U.S. PATENT DOCUMENTS

| | | |
|---|---|---|
| 3,294,509 | 12/1966 | Soubier et al. |
| 3,900,554 | 8/1975 | Lyon |
| 4,115,515 | 9/1978 | Tenner et al. |
| 4,117,075 | 9/1978 | Sano |
| 4,216,060 | 8/1980 | Murata et al. |
| 4,328,020 | 5/1982 | Hughes .......................... 65/134 X |

Primary Examiner—Robert L. Lindsay, Jr.
Attorney, Agent, or Firm—Dennis G. Millman

[57] ABSTRACT

Afterburning is employed with selective, non-catalytic reduction by ammonia injection to reduce $NO_x$ emissions of a process furnace, especially a glass melting furnace.

10 Claims, 3 Drawing Figures

MELTING GLASS WITH TWO STAGE $NO_x$ CONTROL

Melting of glass entails the combustion of large amounts of fuel in a melting furnace in order to provide the required melting temperatures by direct heating. The fuel (usually natural gas and sometimes fuel oil) is usually mixed with an excess of air beyond that theoretically required for complete combustion in order to assure that complete combustion actually occurs within the furnace for the sake of thermal efficiency, and, particularly in the case of flat glass melting operations, to assure that oxidizing conditions are maintained within the furnace. This combination of conditions within a glass furnace is conductive to the oxidation of nitrogen in the combustion air to $NO_x$.

$NO_x$ is a short-hand designation for NO and/or $NO_2$. In the high temperature conditions of a glass melting furnace, the oxide of nitrogen formed is almost entirely NO, but after exhaust containing NO is released to the atmosphere, much of the NO is converted to $NO_2$. $NO_2$ is considered an objectionable air pollutant; it is also believed to be involved in the chemistry of smog formation. Therefore, large volume combustion sources such as glass melting furnaces are susceptible to governmental regulation that may severely restrict their operation.

Many proposals have been made for controlling $NO_x$ emissions from boilers, internal combustion engines, and the like, but most are incompatible with process furnaces as employed for melting glass. Many of the previous proposals involve catalytic destruction of $NO_x$, but catalytic treatment of glass furnace emissions has been found to be unsatisfactory because the required catalyst contact devices quickly become plugged and corroded due to the particulate content and corrosiveness of glass furnace exhaust. Other proposals involve modifying combustion conditions, but substantial modifications in a glass melting furnace are restricted by the requirements of the melting process. Some $NO_x$ control proposals involve treating the exhaust gas within narrow temperature ranges, but in a glass furnace employing regenerators, wherein the firing is reversed periodically, the exhaust gas temperatures are continually changing. Yet another category of prior art $NO_x$ removal processes entails chemically reacting the $NO_x$ at reduced temperature, usually in a liquid phase. Such techniques appear to be prohibitively costly for application to glass furnace emissions due to the large cooling capacity and chemical consumption requirements and liquid waste disposal problems. It has been proposed to "afterburn" exhaust gases to reduce $NO_x$ formation by injecting additional fuel downstream from the main combustion zone. However, the reaction apparently is relatively inefficient, resulting in a relatively low rate of $NO_x$ suppression and/or excessive fuel consumption as practiced in the prior art.

A non-catalytic process for selectively reducing NO to nitrogen and water by injecting ammonia into an exhaust gas stream is disclosed in U.S. Pat. No. 3,900,554. Because it does not require catalysts or process modifications, such a technique would be attractive to glass producers, except that the process is effective in only a narrow range of temperatures. This is because the following competing reactions take place in typical exhaust gas environments.

$$4NH_3 + 4NO + O_2 = 4N + 6H_2O \tag{1}$$

$$4NH_3 + 5O_2 = 4NO + 6H_2O \tag{2}$$

At temperatures below the critical range, neither reaction takes place appreciably, so there is no improvement in $NO_x$ emissions. Within the temperature range, reaction (1) predominates, and therefore there is a net reduction of NO. At higher temperatures, reaction (2) becomes more significant, with the result that the amount of NO in the exhaust gas stream is increased. Therefore, this $NO_x$ reduction had been considered limited in its applicability to boilers and the like where well-defined, stable temperature zones could be identified and utilized for ammonia injection. The patent also discloses that the useful temperature range can be broadened by injecting hydrogen together with the ammonia, but not to the extent that temperature variability can be disregarded. A variation of this technique is disclosed in U.S. Pat. No. 4,115,515 where ammonia is injected at two different zones of a boiler, with hydrogen at one location and without hydrogen at the other location.

In U.S. patent application Ser. No. 209,631, now U.S. Pat. No. 4,328,020 filed on Nov. 24, 1980, by David E. Hughes, it is disclosed that selective, non-catalytic reduction of $NO_x$ by ammonia injection can be effectively employed on glass furnace exhaust streams under certain conditions. There, it is reported that suitable conditions for ammonia reduction of $NO_x$ exist, or can be created, for a substantial portion of each firing cycle in a flue connecting primary and secondary regenerator chambers. Ammonia injection is discontinued whenever the temperature of the exhaust gas passing through the flue falls outside the range of 870° C. to 1090° C. (700° C. to 1090° C. if accompanied by hydrogen). In another embodiment disclosed in the aforesaid application, ammonia is injected into two or more zones of the regenerator sequentially as the temperature in each zone passes through the effective $NO_x$ reduction range. Although the methods of that application are capable of removing a large portion of the $NO_x$ from glass furnace exhausts, the overall effectiveness is reduced by the ineffectiveness of the ammonia reduction technique during substantial portions of each firing cycle when the exhaust gas temperatures are unsuitable. Also, even at the optimum conditions, efficiency of the ammonia reduction reaction is not one hundred percent. Therefore, it would be desirable to improve upon the process so as to eliminate an even greater portion of the $NO_x$ emissions from a glass melting furnace.

SUMMARY OF THE INVENTION

It has now been found that afterburning may be used in conjunction with ammonia injection to achieve high levels of $NO_x$ reduction in glass melting furnaces. During portions of each firing cycle when thermal conditions render ammonia injection ineffective, fuel may be injected into selected portions of the exhaust passages to suppress $NO_x$ formation. Whereas ammonia injection performs best in the range of 1600° F. to 2000° F. (870° C. to 1090° C.), it has been found that afterburning is most useful when fuel is injected into exhaust gas whose temperature is at least 2600° F. (1420° C.). Thus, fuel is injected at a location upstream from the ammonia injection site, at a location where the exhaust gas temperature is at least 2600° F. (1420° C.) at the onset of each firing cycle. Suitable locations for fuel injection are in the port mouth and neck areas and in the plenum space above the regenerator packing on the exhaust side.

Afterburning may be utilized beneficially during the entire firing cycle, but the greatest benefit is obtained when afterburning and ammonia injection are used sequentially or during overlapping periods. Exhaust gas passing through the preferred zones for ammonia injection are typically at a temperature below the desired range for ammonia injection at the beginning of the exhaust phase of each firing cycle. But during that period before ammonia injection is initiated, temperatures at the upstream fuel injection locations are suitable for $NO_x$ reduction by afterburning. Thus, afterburning is preferably employed during the initial portion of each exhaust phase and then discontinued when conditions are proper for ammonia injection.

THE DRAWINGS

DETAILED DESCRIPTION

The invention will be described herein in conjunction with a typical flat glass melting furnace and it is in that context that the combination of regenerator structures and exhaust gas temperatures will be found in which the invention will find its greatest utility. However, the principles of the present invention may be applied to any type of glass melting furnace in which the same or similar conditions are encountered.

Figure 1:
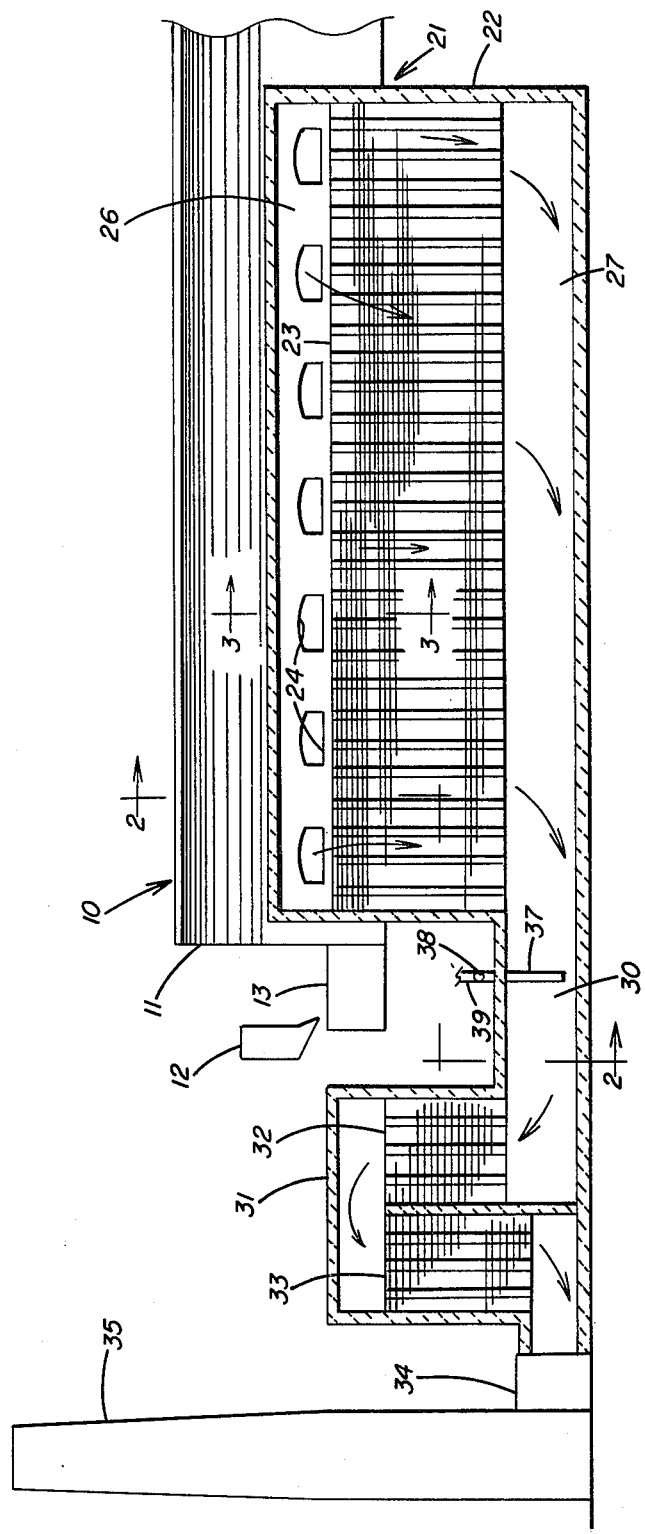
FIG. 1 is side view of a flat glass melting furnace along a longitudinal cross-section through the regenerator system. The regenerator is of the type having two chambers, and an ammonia injection grid in accordance with the present invention is depicted in the flue between the regenerator chambers.
Figure 2:
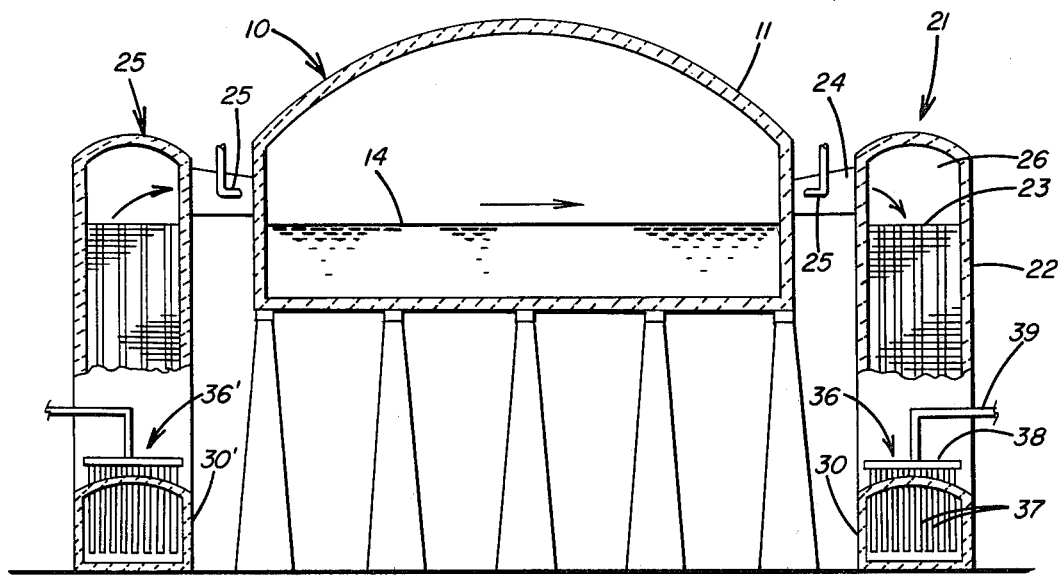
FIG. 2 is a lateral cross-sectional view of the flat glass furnace of FIG. 1, taken along line 2—2 on FIG. 1.

In FIGS. 1 and 2 there is depicted a conventional flat glass melting furnace 10 having a melting chamber 11 into which raw glassmaking ingredients are fed from a hopper 12 into an inlet extension 13 of the furnace (FIG. 1). The raw glass batch materials are deposited onto a pool of molten glass 14 (FIG. 2) maintained within the melter. The furnace is of the well known cross-fired, regenerative type wherein the melter 11 is flanked by a pair of primary regenerators 20 and 21 of like construction. Each regenerator includes a refractory housing 22 containing a bed of regenerator packing 23 which comprises a checker structure of refractory brick permitting the alternate passage of air and exhaust gas therethrough. Each of the primary regenerators 20 and 21 communicates with the melter 11 by means of a plurality of ports 24 spaced along the sides of the melter. Each port opens at one end of the interior of the melter and at the other end to a plenum space 26 above the packing 23 in the regenerator. Below the packing in each regenerator is a distributing space 27 which communicates at one end with a flue 30. In the embodiment shown in FIG. 1 the flue 30 leads to a secondary regenerator 31 which may include a first pass checker packing 32 and a second pass checker packing 33. From the secondary regenerator the gas flows through a reversing valve mechanism 34 and then to a smokestack 35.

Flows through the furnace are reversed periodically (e.g., about every 10 minutes). In the mode of operation depicted in the drawings, the gas flows are from left to right (as viewed in FIG. 2) wherein incoming combustion air enters through the left-hand regenerator 20 and exhaust gases exit from the melter through the right-hand regenerator 21. The incoming combustion air is preheated by the regenerator packings on the left side, and fuel (natural gas or oil) is mixed with the preheated air by means of burner nozzles 25 in the left-hand ports 24, whereby flames extend from left to right over the molten glass 14 within the melter. During this phase of the firing cycle the burner nozzles 25 in the right-hand ports remain inactive. The exhaust gases leaving the melter through the right-hand ports 24 pass through the primary regenerator 21 where heat from the gas stream is transferred to the checker packing 23. In the preferred embodiment depicted, the recovery of waste heat by the regenerator system is only partially accomplished by the primary regenerator 21. Additional heat recovery is accomplished farther downstream in the secondary regenerator 31. When the temperature of the checker packing approaches its upper limits, the firing is reversed. The burners on the left side of the furnace are turned off and the burners on the right side are turned on, and incoming combustion air is passed through the right-hand regenerator 21 and the exhaust gases leave the melter by way of the left-hand regenerator 20.

Referring still to FIGS. 1 and 2, there is shown a preferred embodiment for $NO_x$ reduction of ammonia injection wherein ammonia injection is carried out in each flue 30 and 30' between each primary regenerator and the corresponding secondary regenerator. In a glass melting furnace of this type it has been found that the temperatures of the exhaust gases passing through the tube 30 lie within the preferred $NO_x$ reduction range of 870° C. to 1090° C. during a substantial portion of the exhaust phase of the firing cycle. This constitutes the subject matter of the aforementioned U.S. patent application Ser. No. 209,631, now U.S. Pat. No. 4,328,020. A preferred means for injecting ammonia into the exhaust stream is a grid 36 comprised of a plurality of apertured tubes 37 of a heat resistant material extending into the flue 30. Each tube 37 is in communication with a header pipe 38 which in turn communicates with a supply pipe 39. The tubes 37 are arranged to promote thorough mixing of ammonia with substantially the entire stream of exhaust gas passing through the flue. An identical grid 36' may be provided in the flue 30' on the opposite side of the furnace.

In the firing mode depicted in the drawings, ammonia injection takes place in the right-hand grid 36 and the left-hand grid 36' is turned off. Immediately after a firing reversal, the temperature of the exhaust gas passing through the flue 30 on the exhaust side is generally found to be below the prescribed $NO_x$ reduction range but rises into range within about 1 to 3 minutes, for example, whereupon ammonia injection may be initiated. It is during this interval that afterburning may be carried out in accordance with the present invention, as will be set forth more fully below. Ammonia injection continues as the temperature of the exhaust gas in the flue continues to rise until the temperature exceeds the $NO_x$ reduction range, whereupon ammonia injection may be discontinued. However, it has been found that with a 10 minute interval between firing reversals, ammonia injection may typically be continued throughout the remainder of the exhaust phase. When firing is reversed the ammonia injection may be shifted to the grid on the opposite side of the furnace. In this manner the exhaust gas stream may be subjected to $NO_x$ reduction during a substantial portion (preferably a majority) of the overall firing cycle. However, it should be understood that improvements in average $NO_x$ emissions may be obtained by treating the exhaust gas stream for shorter periods of time than the maximum feasible times. For example, substantial improvements could be obtained even if only one grid is provided and ammonia injection is carried out on only one side of the furnace.

Ammonia gas is preferably provided to the grid 36 with a carrier gas (e.g., air or steam). The flow rate of ammonia will depend upon the degree of $NO_x$ reduction desired and the efficiency of the reaction. As may be seen in equation (1) above, theoretically one mole of ammonia reduces one mole of NO, but of course in actual practice, reaction efficiencies less than 100% are obtained due to imperfect mixing, less than ideal thermal conditions, etc. Therefore, a molar ratio of ammonia to nitrogen oxide greater than 1 is usually required to maximize $NO_x$ reduction. However, in many cases maximization may not be required and therefore, for the sake of economy, molar ratios of 1 or less may be employed. Typically, molar ratios of $NH_3$ to NO between 0.5 and 2.0 are suitable. Ratios close to 1.0 yield a balance between economy and effectiveness.

The theoretical aspects of the noncatalytic selective reduction of $NO_x$ by ammonia are set forth in the aforesaid U.S. Pat. No. 3,900,554, the disclosure of which is hereby incorporated by reference. The presence of oxygen is required for the reduction to proceed. In a flat glass furnace conventionally fired with an excess of air, it has been found that sufficient oxygen is normally present without requiring modification of the combustion parameters.

The process of reducing $NO_x$ by ammonia injection may include variations wherein hydrogen together with ammonia are injected into the exhaust gas stream to reduce $NO_x$ as disclosed in U.S. Pat. Nos. 3,900,554 and 4,115,515. The inclusion of hydrogen extends the lower limit of the reduction temperature range to about 700° C., thereby permitting reduction to take place at locations or times in which the temperature of the exhaust gases would be below the range for effective reduction of $NO_x$ by ammonia alone. This may be implemented by first injecting an ammonia-hydrogen mixture when the exhaust gas temperatures are between 700° C. and 870° C., and subsequently injecting ammonia alone at the same location when the temperature rises above 870° C. Alternatively, the modification could be implemented, for example, by providing a second injection grid downstream from the grid 39 in the flue for injecting the ammonia-hydrogen mixture in a lower temperature region simultaneously with the injection of ammonia alone at the upstream location.

Other variations of the ammonia injection process are disclosed in the aforementioned U.S. patent application Ser. No. 209,631, now U.S. Pat. No. 4,328,020, and the disclosure of those variations is incorporated herein by reference.

Figure 3:
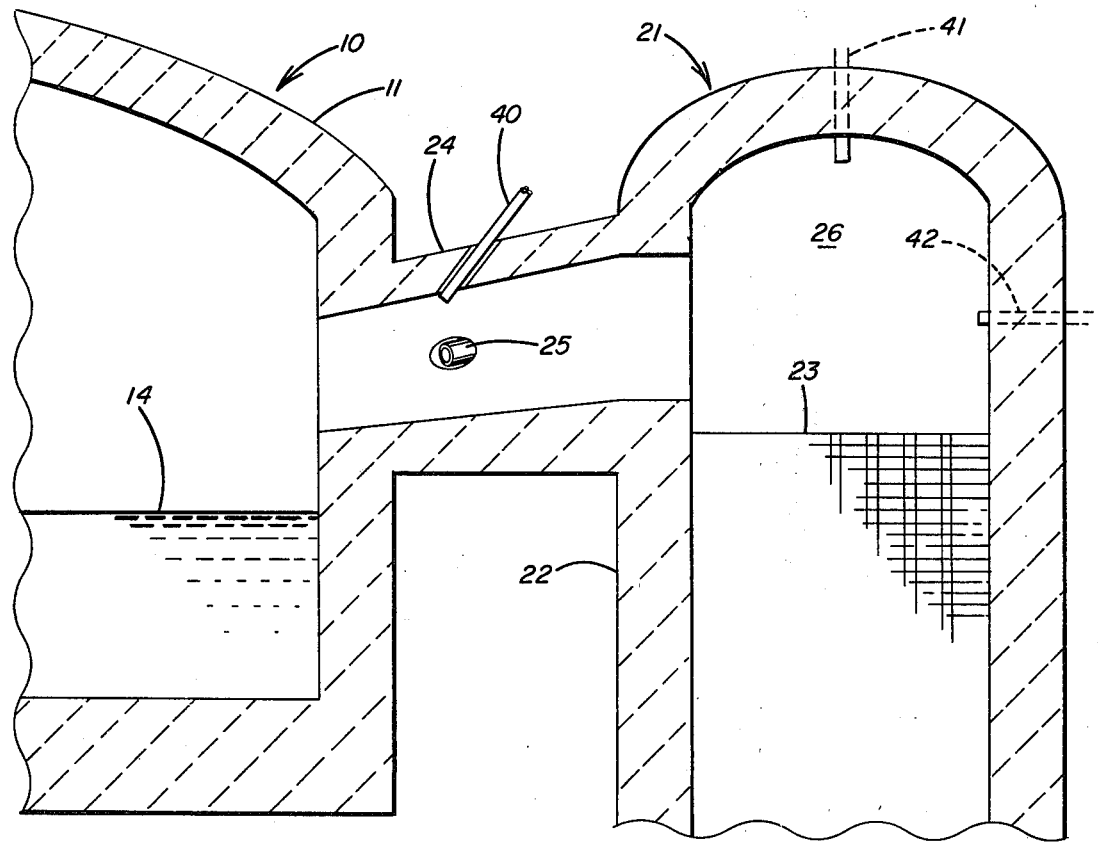
FIG. 3 is an enlarged cross-sectional view along a port and the upper portion of a regenerator, showing fuel injection locations.

Afterburning serves to suppress $NO_x$ formation by consuming oxygen that would otherwise be available for $NO_x$ formation. It is also possible that the absence of oxygen causes $NO_x$ to decompose, and that the presence of a combustible fuel causes chemical reduction of $NO_x$. All the above mechanisms require that afterburning be carried out at a temperature where $NO_x$ formation is likely. It is believed that the best results are achieved when a combustible fuel is mixed with exhaust gases that are at a temperature of at least 2600° F. (1420° C.). The location for fuel injection should also be conducive to a thorough mixing of the fuel with the exhaust gases. Thermal conditions will vary from one glass melting furnace to another, but in a typical large scale flat glass melting furnace of the type shown in the drawings, suitable temperature conditions for afterburning have been found to exist on the exhaust side of the furnace from the mouth of each port 24 opening onto the melting chamber 11, to the upper portion of the regenerator packing 23. However, it has been found that afterburning is more effective when fuel injection takes place upstream of the regenerator packing, apparently due to poor mixing within the regenerator packing. The most preferred injection locations are those closest to the mouth of each port, thereby maximizing the mixing and the residence time above the critical temperature. An example of a preferred fuel injection location is shown in FIG. 3 where a fuel nozzle 40 extends into the neck portion of a port 24 from above. The nozzle 40 is angled counter to the direction of exhaust gas flow to promote mixing. Fuel injection nozzles 41 and 42 shown in phantom lines in FIG. 3 illustrate alternative but less effective locations for fuel injection in the region of the upper plenum 26 in approximate alignment with the respective port 24. Fuel may be injected from a plurality of nozzles associated with each port to further enhance mixing. Fuel injection may also take place slightly inside melting chamber 11 in front of a port mouth. A fully equipped $NO_x$ control arrangement would have fuel injection means associated with each port but, of course, partial advantages may be attained by equipping only a portion of the ports with afterburning capability. It is not uncommon in a multiport furnace for different ports to be fired at different rates and with different fuel/air ratios. Therefore, is some cases, it will be most productive to limit afterburning to those ports having greater firing rates and/or the greatest amounts of excess oxygen remaining in the exhaust gas stream.

The fuel employed for afterburning may be any combustible hydrocarbon commonly employed as a furnace fuel, and most conveniently the same fuel employed in the main combustion chamber, which is most commonly natural gas (methane). The amount of gas injected is preferably near the amount stoichiometrically required for complete consumption of oxygen in the exhaust gas stream at the location of injection. It has been found that injecting greater amounts of fuel provides very little, if any, benefit in $NO_x$ consumption and can lead to the discharge of partially combusted materials. Maximum afterburning in the entire exhaust gas stream of a furnace requires the use of additional fuel in an amount up to about 10% of the fuel consumed in the main combustion zone of the melter, and typically, four to eight percent additional fuel has been found to be effective. This additional fuel may be concentrated in only a few of the ports where the greatest amounts of excess oxygen are found since it is common to operate a glass melting furnace with varying degrees of oxidation potential from one port to another. Those ports fired with the highest air to fuel ratios may be responsible for a major portion of the $NO_x$ formation and, thus, afterburning efforts may be concentrated on the exhaust side of those ports.

The degree of mixing between the injected afterburning fuel and the exhaust gas stream appears to be a major factor in the effectiveness of the afterburning. The best results are obtained when the gas is injected countercurrent to the direction of the exhaust gas flow or at least at an obtuse angle with respect thereto. Countercurrent injection is particularly effective in the port neck region. The gas may be injected at about 50 to 500 feet per second (STP)(15 to 150 meters per second).

An advantage for removing $NO_x$ by afterburning upstream from the regenerator packing is that heat produced by the afterburning may be partially recovered by the regenerators. Afterburning in accordance with the present invention has been found to produce a definite increase in the temperatures of the checker packing in the regenerators on the order of 70° to 80° F. (40° to 45° C.) as an example. In those cases where the support elements for the checker packing are near their upper temperature limit, it may be desirable to monitor their temperatures and to limit the amount of afterburning accordingly.

The maximum effectiveness of afterburning alone carried out in accordance with the above description has been found to be an $NO_x$ removal rate of about 25 to 30 percent, and providing additional afterburning fuel appears to offer no appreciable improvement. Therefore, it is believed that 70 percent or more of the $NO_x$ is already formed when the exhaust gas passes through the exhaust port, and that afterburning is relatively ineffective at reducing $NO_x$ that has already been formed. The level of afterburning performance will remain essentially constant throughout the exhaust cycle. $NO_x$ reduction by noncatalytic ammonia injection, on the other hand, can attain instantaneous $NO_x$ removal rates of about 95 percent, but because the process can be used only during portions of each exhaust cycle, maximum overall removal rates are typically about 60 to 70 percent. Employing both processes simultaneously does not result in an addition of their $NO_x$ removal rates since afterburning may decrease the efficiency of the ammonia injection process. However, employing the two processes sequentially in time can increase overall $NO_x$ removal rates by about 10 to 50 percent above the rates obtained by ammonia injection alone.

Specific preferred embodiments have been described in detail for the sake of illustrating the invention and for disclosing the best mode, but it should be understood that other variations and modifications as are known to those skilled in the art may be resorted to without departing from the scope of the invention as defined by the claims which follow.

We claim:

1. A method for controlling $NO_x$ emissions from a process furnace in which combustion of fuel produces an exhaust gas stream including $NO_x$ compounds, and the exhaust gas stream passes away from the furnace through passages in which exhaust gas temperatures upon entering the passages are above 1420° C. and the exhaust gas temperatures fall during passage through the passages, and the exhaust gas temperature in downstream portions of the passages fluctuate with time within and outside the range 700° C. to 1090° C., comprising injecting ammonia into the exhaust gas stream at a downstream portion of the passages when the exhaust gas temperature there is from 700° C. to 1090° C. so as to reduce $NO_x$ compounds, and when the exhaust gas temperature at the ammonia injection location is outside the range of 700° C. to 1090° C. injecting fuel into an upstream portion of the passages at which the exhaust gas temperature is at least 1420° C. so as to consume oxygen by combustion of the injected fuel.

2. The method of claim 1 wherein the process furnace is a glass melting furnace.

3. The method of claim 1 wherein the passages through which the exhaust gases pass include heat recovery means.

4. The method of claim 3 wherein the heat recovery means include a regenerator in which the exhaust gases pass through a packing of heat absorbing material.

5. The method of claim 4 wherein gas flows are periodically reversed.

6. The method of claim 4 wherein the location of ammonia injection is downstream from the packing, and the location of fuel injection is upstream from the packing.

7. The method of claim 1 wherein ammonia is injected only when the exhaust gas temperature at the ammonia injection location is from 870° C. to 1090° C.

8. The method of claim 1 wherein the ammonia is injected at a location in the passages where exhaust gas has a temperature from 700° C. to 1090° C. during a majority of the time that exhaust gas is passing through that location.

9. The method of claim 8 wherein the ammonia is injected at a location in the passages where exhaust gas has a temperature from 870° C. to 1090° C. during a majority of the time that exhaust gas is passing through that location.

10. A method of melting glass comprising: feeding glass batch materials into a melting furnace where they are heated by combustion of fuel which produces an exhaust gas stream including $NO_x$ compounds, passing the exhaust gas stream from the furnace at a temperature of at least 1420° C. to a regenerator during an exhaust phase of a reversing cycle, transferring heat from the exhaust gas stream to packing within the regenerator whereby the temperature of the exhaust gas stream falls during passage through the regenerator and in downstream portions of the exhaust gas stream the exhaust gas temperature varies within and outside the range 700° C. to 1090° C., during an initial period of the exhaust phase injecting fuel into the exhaust gas stream in a zone between the melting furnace and the regenerator packing where the exhaust gas temperature is above 1420° C. so as to consume oxygen by combustion of the injected fuel, and during a subsequent period of the exhaust phase injecting ammonia into the exhaust gas stream in a zone downstream from the region of fuel injection while the temperature of the exhaust gas stream is from 700° C. to 1090° C., thereby reducing the $NO_x$ content of the exhaust gas stream.

* * * * *